(12) United States Patent
Pierce et al.

(10) Patent No.: US 6,530,102 B1
(45) Date of Patent: Mar. 11, 2003

(54) SCRUBBER HEAD ANTI-VIBRATION MOUNTING

(75) Inventors: Paul M. Pierce, Grand Haven, MI (US); Steven John Albert Waldhauser, Niagara Falls, NY (US)

(73) Assignee: Tennant Company, Minneapolis, MN (US)

( * ) Notice: Subject to any disclaimer, the term of this patent is extended or adjusted under 35 U.S.C. 154(b) by 0 days.

(21) Appl. No.: 09/421,909

(22) Filed: Oct. 20, 1999

(51) Int. Cl.[7] .................. A47L 11/14; A47L 11/282
(52) U.S. Cl. .................. 15/52.1; 15/49.1; 15/50.1
(58) Field of Search .................. 15/49.1, 50.1, 15/50.3, 52.1, 98, 51, 52, 82, 79.2

(56) References Cited

U.S. PATENT DOCUMENTS

| | | |
|---|---|---|
| 1,389,125 A | 8/1921 | Chappell |
| 2,648,856 A | 8/1953 | Van Der Heem |
| 4,037,289 A | 7/1977 | Dojan |
| 4,096,084 A | 6/1978 | Thomsen et al. |
| 4,173,056 A | 11/1979 | Geyer |
| 4,194,263 A | 3/1980 | Herpers et al. |
| 4,262,382 A | 4/1981 | Brown et al. |
| 4,295,244 A | 10/1981 | Herpers et al. |
| 4,334,335 A | 6/1982 | Brown et al. |
| 4,348,783 A | 9/1982 | Swanson et al. |
| 4,364,138 A | 12/1982 | Waldhauser et al. |
| 4,365,189 A | 12/1982 | Hawkins et al. |
| D267,824 S | 2/1983 | Mannelly |
| 4,377,017 A | 3/1983 | Herpers et al. |
| 4,378,855 A | 4/1983 | Haub et al. |
| 4,393,538 A | 7/1983 | Olson |
| D273,621 S | 4/1984 | Haub et al. |
| 4,709,771 A | 12/1987 | Basham et al. |
| 4,729,141 A | 3/1988 | Berg et al. |
| 4,757,566 A | 7/1988 | Field et al. |
| 4,819,676 A | 4/1989 | Blehert et al. |
| 4,825,500 A | 5/1989 | Basham et al. |
| 4,866,804 A | 9/1989 | Masbruch et al. |
| 5,016,310 A | 5/1991 | Geyer et al. |
| 5,044,043 A | 9/1991 | Basham et al. |
| 5,088,149 A | 2/1992 | Berg et al. |
| 5,093,955 A | 3/1992 | Blehert et al. |
| RE33,926 E | 5/1992 | Waldhauser |
| 5,212,848 A | 5/1993 | Geyer |
| 5,231,725 A | 8/1993 | Hennessey et al. |
| 5,244,003 A | 9/1993 | Boomgaarden |
| 5,369,838 A | * 12/1994 | Wood |
| 5,483,718 A | 1/1996 | Belhert et al. |
| 5,507,061 A | 4/1996 | Miyazaki |
| 5,515,568 A | 5/1996 | Larson et al. |
| 5,566,422 A | 10/1996 | Geyer |
| 5,611,105 A | 3/1997 | Blehert et al. |
| 5,991,951 A | * 11/1999 | Kubo |

* cited by examiner

Primary Examiner—Randall E. Chin
(74) Attorney, Agent, or Firm—Price, Heneveld, Cooper, DeWitt & Litton

(57) ABSTRACT

A floor surface conditioning machine, typically a floor scrubbing machine comprising a support structure and supporting wheels, powered scrub brushes beneath the support structure, a brush carriage connecting the scrub brushes to the support structure, and a frictional motion dampener between the brush carriage and the support structure to dampen vibration of the brush carriage caused by the scrub brushes, this frictional motion dampener having a pair of friction members spaced from each other and astraddle a fixed member, and a pair of biasing springs biasing the pair of friction members against opposite sides of the fixed member. The fixed member includes a cam track and the friction members have a cam follower therebetween to follow the cam track during vertical movement of the brush carriage.

27 Claims, 8 Drawing Sheets

SCRUBBER HEAD ANTI-VIBRATION MOUNTING

BACKGROUND OF THE INVENTION

This invention relates to conditioning machines having powered floor conditioning rotating elements which engage the floor, and especially to floor scrubbing machines having powered rotary brushes. The invention provides floor conditioning machines having unique anti-vibration brush mounting mechanism. The novel apparatus could be employed on machines for hard surface floor scrubbing, carpet cleaning/scrubbing, surface sweeping, floor polishing, and floor sanding.

Floor conditioning machines, particularly floor scrubbing machines, especially those using horizontally oriented cylindrical scrub brushes, often exhibit excessive vibration with accompanying brush chatter, noise, and lost scrubbing performance. This occurs with vibration of the brushes on the floor surface and especially with polymeric cylindrical brushes which tend to be more aggressive. Depending upon various floor surface characteristics over which the brushes move, a harmonic vibration can occur which is highly disruptive. Several techniques have been tried in the past in efforts to eliminate this undesirable tendency.

SUMMARY OF THE INVENTION

The present invention will be illustrated as applied to a floor scrubbing type of floor conditioning machine. It combats scrubber vibration and chattering with a special scrubber brush suspension apparatus. The suspension employs anti-vibration friction pad elements retained in a balanced biased relationship to a fixed member, to dampen vibration in a manner to combat excessive vibration, particularly harmonic vibration. These friction pad elements are biased against the fixed member by a pair of counterbalancing springs which allow lateral rocking and shifting of the brush assembly to accommodate uneven floor surfaces, while also controlling vibration.

These and several other features, objects and advantages of the invention will become apparent upon studying the following description in conjunction with the drawings.

DESCRIPTION OF THE PREFERRED EMBODIMENT

Figure 1:
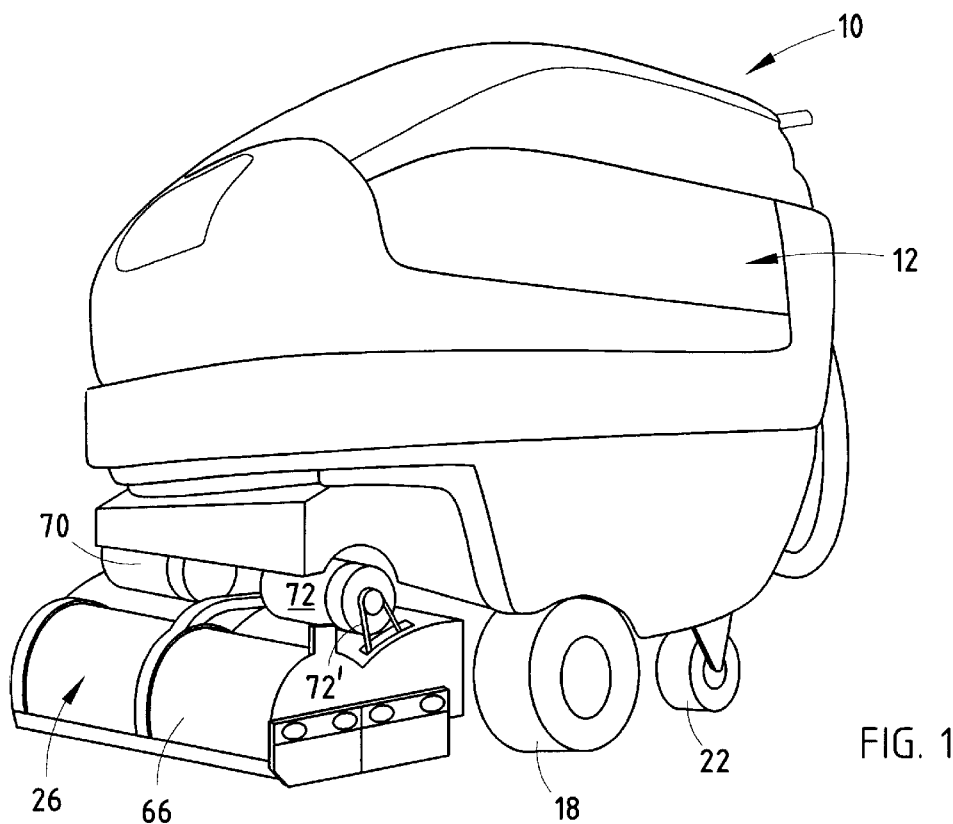
FIG. 1 is a front perspective view of a floor scrubbing machine employing the invention.

In the drawings, FIGS. 1–8 are used to explain the unique suspension system as applied to a floor scrubbing type of floor conditioning system. Thus the rotationally powered, floor engageable, conditioning elements are scrub brushes for cleaning floor surfaces, particular hard surface floors. This usage has shown the development to be particularly effective. In floor scrubbing machines, those with cylindrical brushes rotating on a horizontal axis have been particularly troublesome in producing vibration and brush chatter.

Referring now specifically to the drawings, the floor scrubbing machine 10 there depicted includes housings 12 embodying the usual and conventional equipment of a clean water chamber, a dirty water chamber, a water pump, a drive motor, and other conventional components well known to those in the art. To avoid complicating the drawings, these conventional components are not specifically depicted.

The floor scrubbing machine has its housing 12 mounted on a support structure or frame. The housing includes a front wall 14 (FIG. 4) for mounting the brush carriage to be described hereinafter. A pair of lower support wheels 18 are mounted on a motorized transaxle 20 (FIG. 3) beneath the center portion of the machine, and rear support wheels 22 (FIG. 1) are pivotally mounted on vertical axes beneath the machine. All four wheels support the machine and engage the floor surface F on which the machine is positioned, to define a horizontal plane of support. Wheels 18 constitute drive wheels for the powered floor scrubbing machine.

Figure 3:
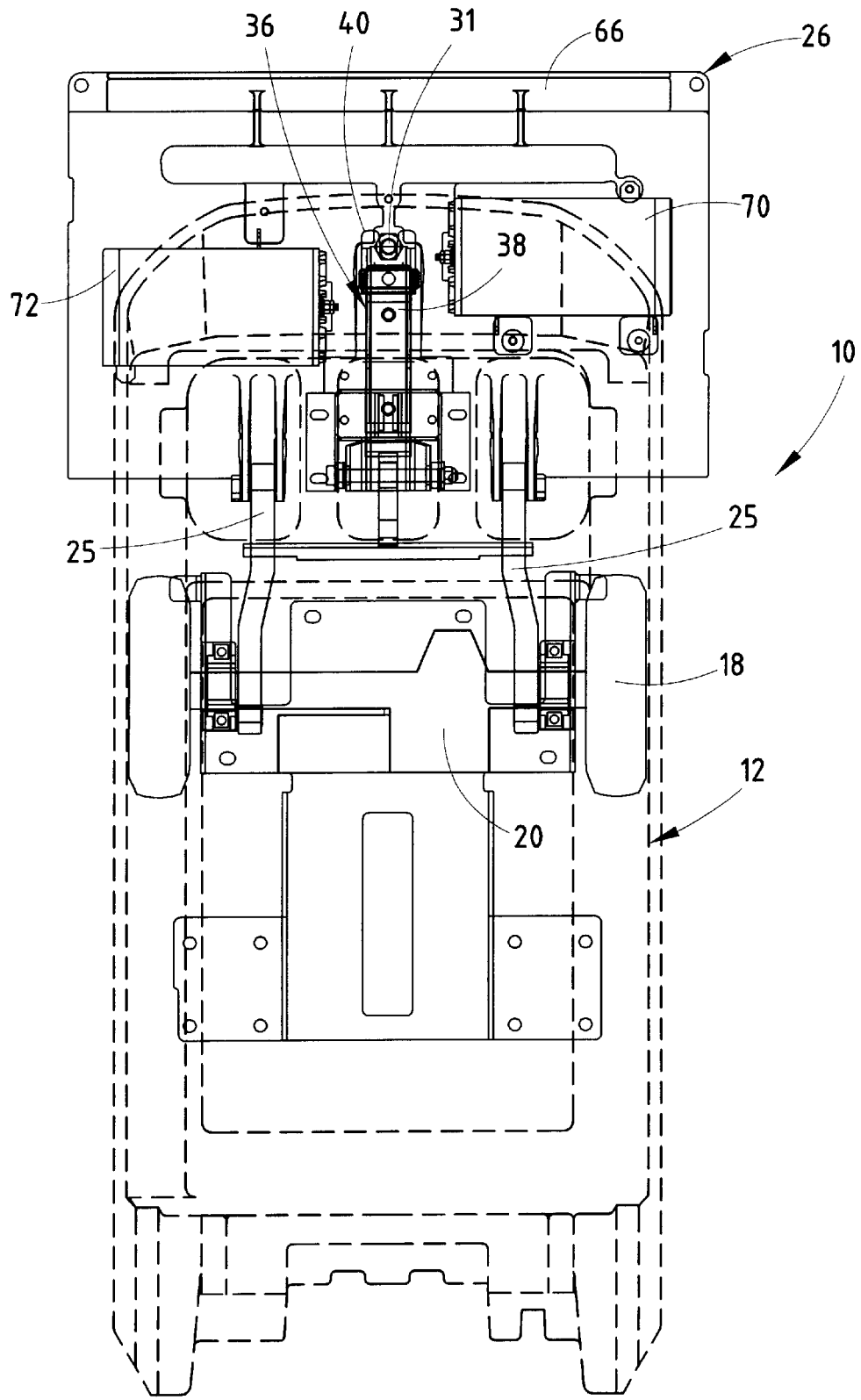
FIG. 3 is a plan view, partially in phantom, of the machine with suspension and carriage components in solid lines.
Figure 4:
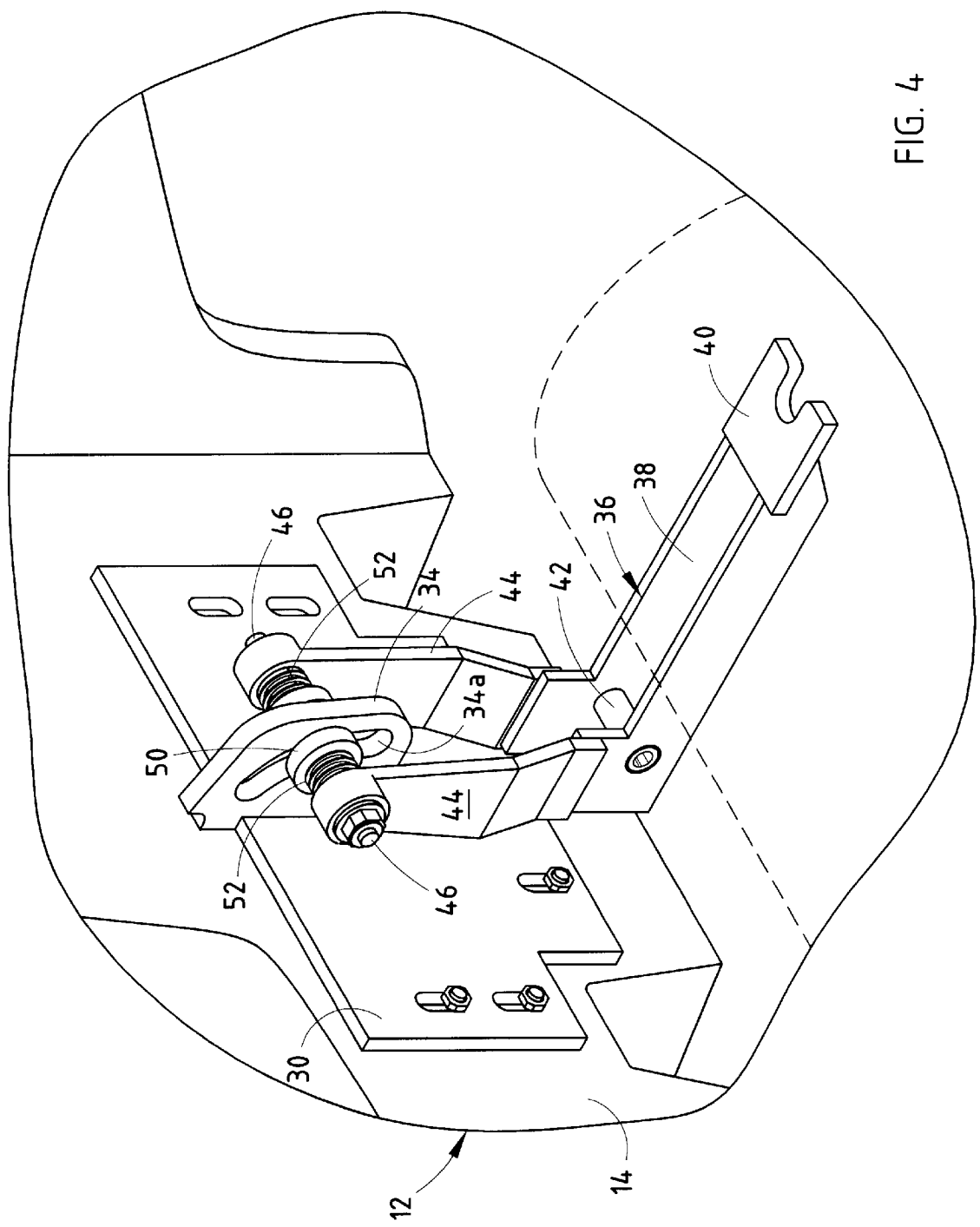
FIG. 4 is an enlarged perspective view of the frictional motion dampener suspension subassembly of this invention.
Figure 5:
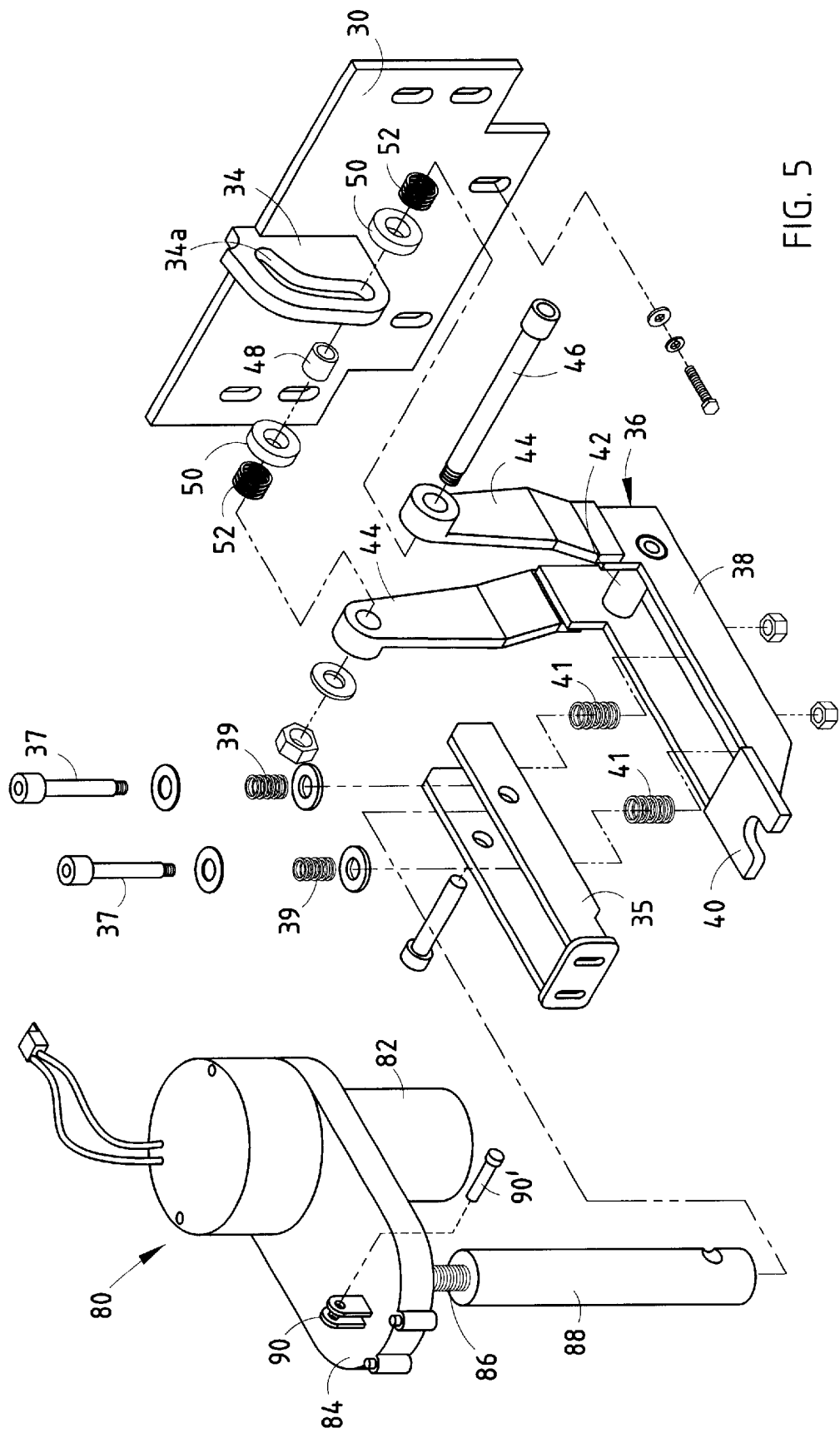
FIG. 5 is an exploded perspective view of the subassembly in FIG. 4, including a lift actuator components.
Figure 6:
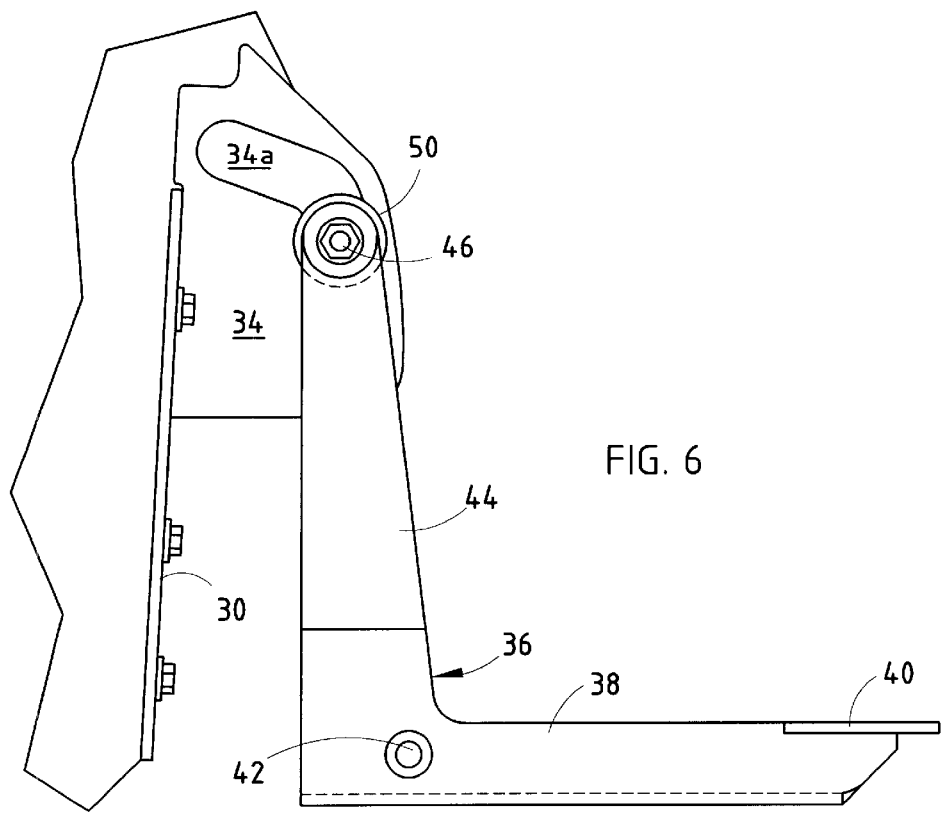
FIG. 6 is an enlarged side elevational view of the subassembly in FIG. 4.
Figure 7:
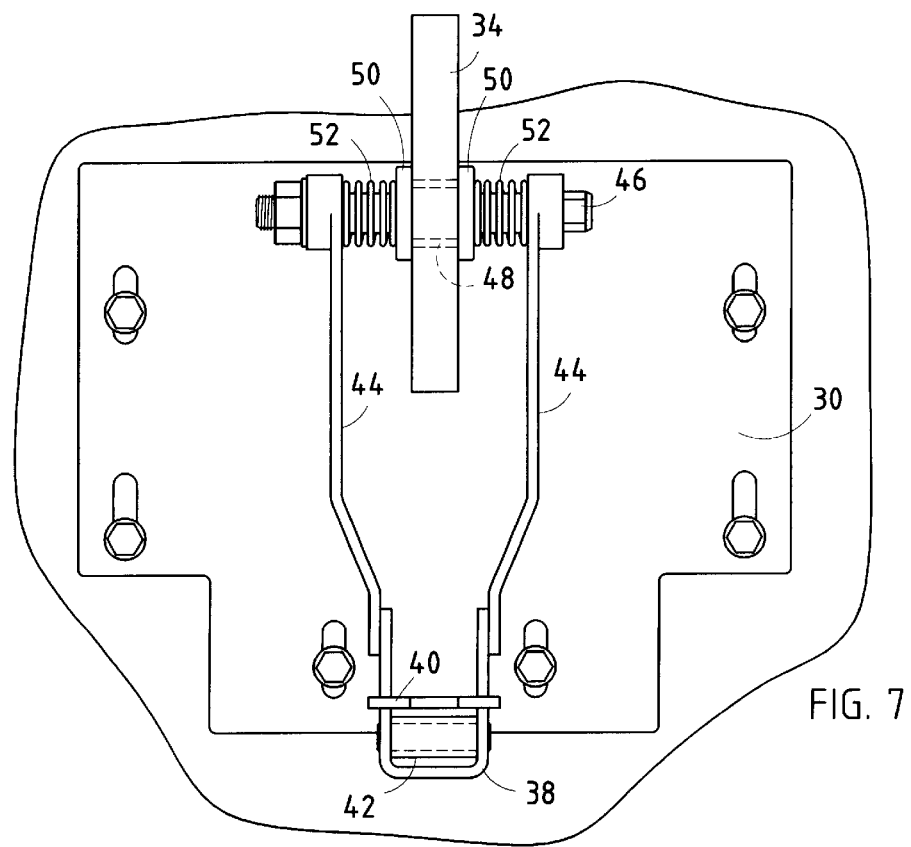
FIG. 7 is a front elevational view of the subassembly in FIG. 6.
Figure 8:
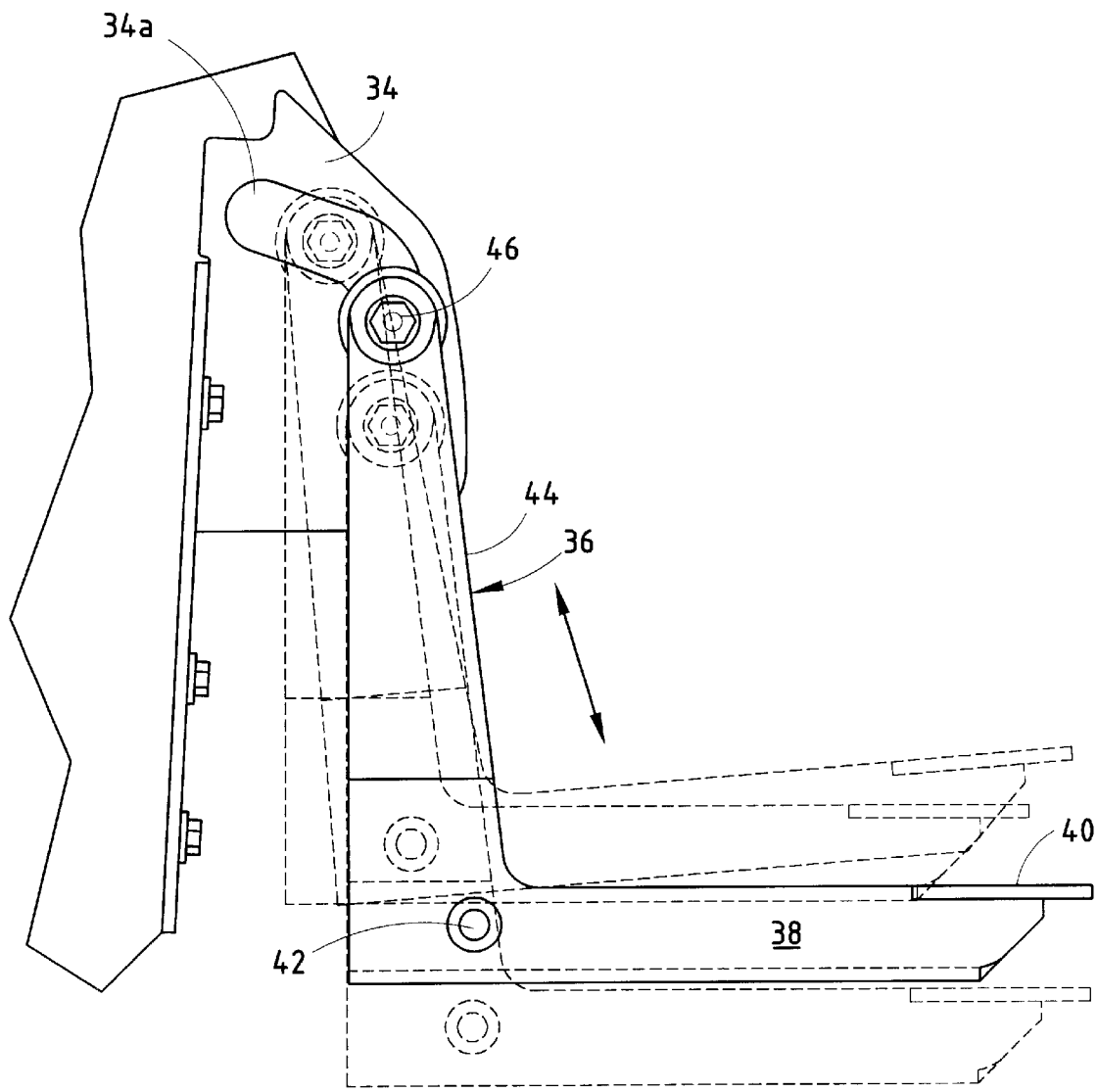
FIG. 8 is a side elevational view of the subassembly in FIGS. 4, 6 and 7, showing alternative height positions of the bracket mounting.

The development set forth herein pertains to the unique vibration control mounting of the brush carriage. More specifically, a brush carriage assembly 26 is mounted at the front of the machine. A pair of laterally spaced links 25 as of a strong polymeric material are pivotally attached to the scrubber housing 12 at the rear end of the links (FIGS. 2 and 3), and are pivotally attached to the rear of the scrubber carriage 26 at the forward ends of the links 25. Bolted to the front panel 14 of the machine is a vertically adjustable, vertically oriented, mounting plate 30 (FIG. 4). Welded to plate 30 to be integral therewith is at least one fixed plate member 34. This member 34 serves to provide a cam track and also a friction brake plate according to the present invention. It includes an upwardly extending slot which serves as the cam track 34a. The lower portion of the cam track 34a is basically vertical in a large radius arc while the upper portion is preferably diagonally upwardly rearwardly extending. This cam track is designed to enable the brush subassembly to be lifted in a manner first staying parallel with the floor surface (see FIG. 8), and then when the upper portion of the cam track is reached, to tilt the brush subassembly upwardly rearwardly for travel of the machine in inoperative condition, as is disclosed in more detail in U.S. Pat. No. 5,483,718, incorporated herein by reference.

Figure 2:
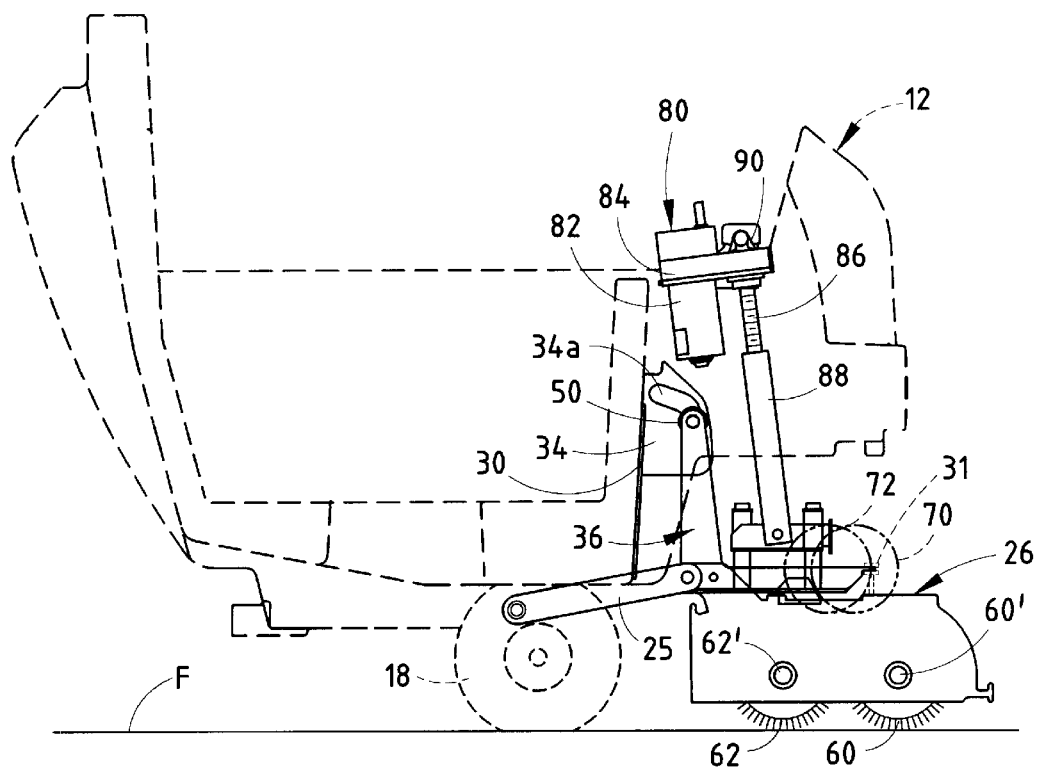
FIG. 2 is a side elevational fragmentary view, partially in phantom, of the scrubbing machine.

The brush carriage subassembly is supported on an L-shaped bracket 36. The lower portion of bracket 36 is composed of a U-shaped channel member 38 connected on the forward end to a forwardly slotted horizontal engagement plate member 40 which engages the brush carriage and specifically straddles a grooved bolt 31 on the carriage (FIGS. 2 and 3). The rearward end of the brush carriage is attached to sleeve pin 42 at the rearward end of channel 38. The rear vertical portion of bracket 36 is formed of spaced, upwardly extending configured plates which form suspension arms 44. At the upper ends of arms 44 is a cross pin or screw 46 which extends through the slot that comprises cam track 34a. At the center of pin 46 is a cylindrical cam follower in the form of a roller 48 (FIGS. 5 and 7) as of a lubricious polymeric material such as nylon, acetal or Teflon®, or of another material such as metal. Astraddle the two opposite, outer friction faces of brake plate 34 at cam track 34a is a pair of friction brake elements in the form of annular discs 50. These discs can be fabricated from materials such as bronze, or polymeric nylon, acetal, or steel surfaced with brake pad lining. These are individually biased into frictional engagement with the opposite faces of brake plate 34 by a pair of helical compression coil springs 52 on screw or pin 46, each extending between respective friction disc elements 50 and arms 44. No biasing force, however, is applied to the cam follower 48, so it can freely follow cam track 34a.

Rotationally mounted to the brush carriage assembly 26 is a pair of transverse, horizontally oriented cylindrical scrub brushes including a front brush 60 and a rear brush 62 mounted on transverse horizontal axles 60' and 62' respectively, within the brush carriage housing 66. Front brush 60 is powered by motor 70 through a drive belt in conventional fashion, while rear brush 62 is powered by motor 72 through a like drive belt 72' in conventional fashion. These brushes rotate in opposite directions in conventional manner.

The brush carriage assembly can be raised or lowered by a power actuator 80 (FIG. 5) which is driven by motor 82 through gear box 84 to rotational threaded screw shaft 86 within non-rotational, internally threaded cylinder 88. The lower end of actuator cylinder 88 is attached to spring bracket 35, while connector tabs 90 and pin 90' (FIG. 5) on actuator 80 are connected to the machine housing 12. Spring bracket 35 is attached to channel 38 by a pair of vertically oriented shoulder screws 37, while being suspended between pairs of upper and lower compression springs 39 and 41 respectively for more exact control by the scrubber operator of the pressure applied by the brushes against the floor. Power driving of screw 86 in one rotary direction or the other will raise or lower the bracket assembly and thus the brush carriage assembly.

Experimental operation with the apparatus employing the novel brush carriage support mechanism shows that the friction pad disc elements 50 in biased relationship to the fixed member 34 controllably dampen vertical vibration and rocking, side-to-side vibration otherwise caused by the rotating brushes, to thereby restrain excessive vibration of the brush carriage assembly, and are particularly effective in preventing harmonic vibration capable of causing significant damage and lost scrubbing performance. Since these friction pad brake elements 50 are biased against member 34 by a pair of counterbalancing springs, the assembly allows lateral rocking and shifting of the brush assembly to accommodate uneven floor surface characteristics while maintaining control of vibration. The total amount of friction is generally constant even though the assembly rocks side to side since any decrease of frictional bias of one spring against its friction element is counterbalanced by increased bias by the opposite spring on its friction element.

Figure 9:
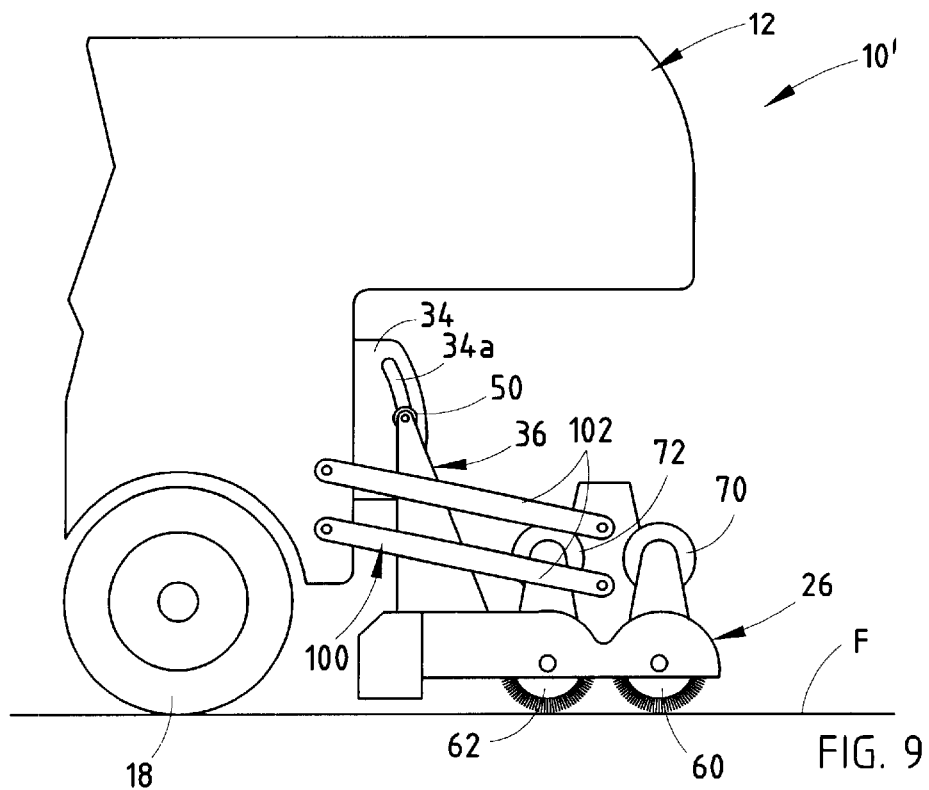
FIG. 9 is a fragmentary side elevational, somewhat diagrammatic view of an alternative suspension system of the scrub brush carriage of a floor scrubbing machine.

Conceivably a parallelogram linkage 100 could be used to maintain parallel relationship of the brush carriage assembly with the floor surface F, as depicted in FIG. 9. This linkage constitutes a pair of upper and lower links 102 on each side of the carriage, having forward ends of the links pivotally connected to brush subassembly 26 and the rear ends of the links pivotally connected to the frame of the machine 10'. This embodiment also employs the cam track 34a and friction plate 34 and the friction disc subassembly elements 50, 52, 46 and 48 for controlling vibration.

Figure 10:
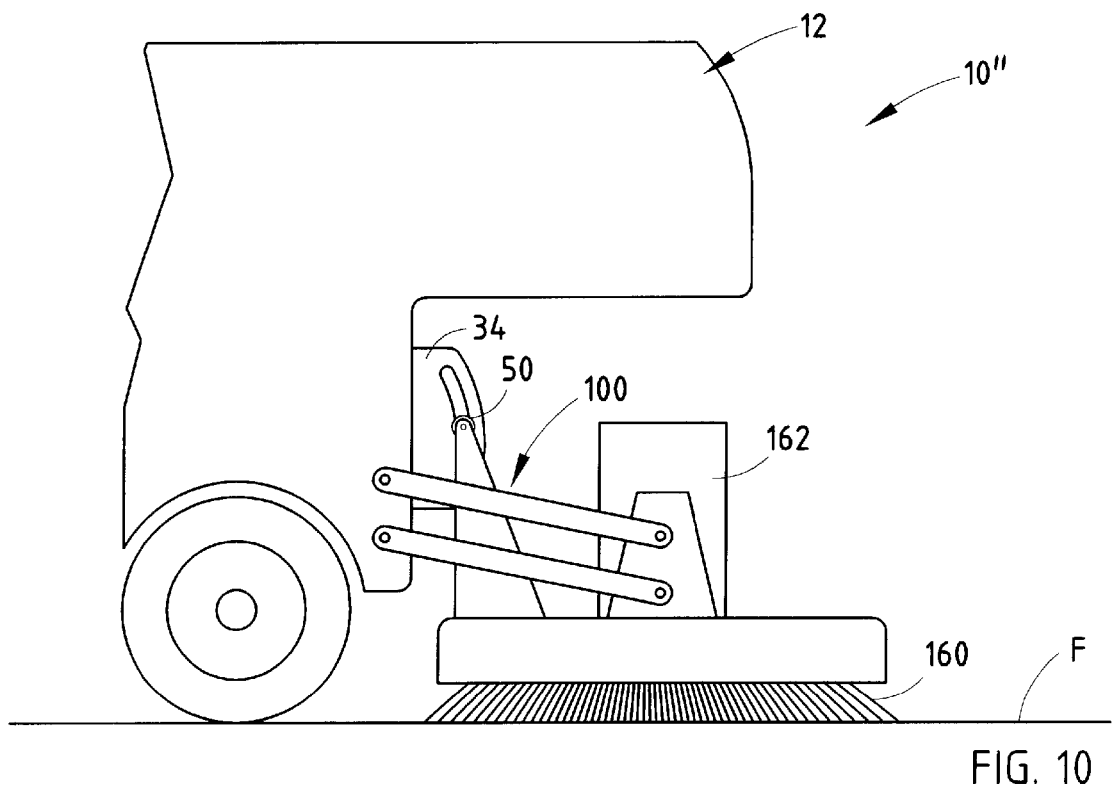
FIG. 10 is a fragmentary side elevational, somewhat diagrammatic view of the alternative arrangement in FIG. 9, but with alternative brushes rotational on a vertical axis.

Instead of cylindrical brushes 60 and 62 as depicted in FIGS. 1–9, the mechanism can be employed on a scrubbing machine 10" (FIG. 10) which employs one or more conventional, horizontally rotating disc brushes 160 which rotate on vertical axes driven by motors 162. However, the vibrational tendencies of this type of brush are not typically as severe as those of a machine having one or more cylindrical brushes of the type depicted in FIGS. 1–9.

Figure 11:
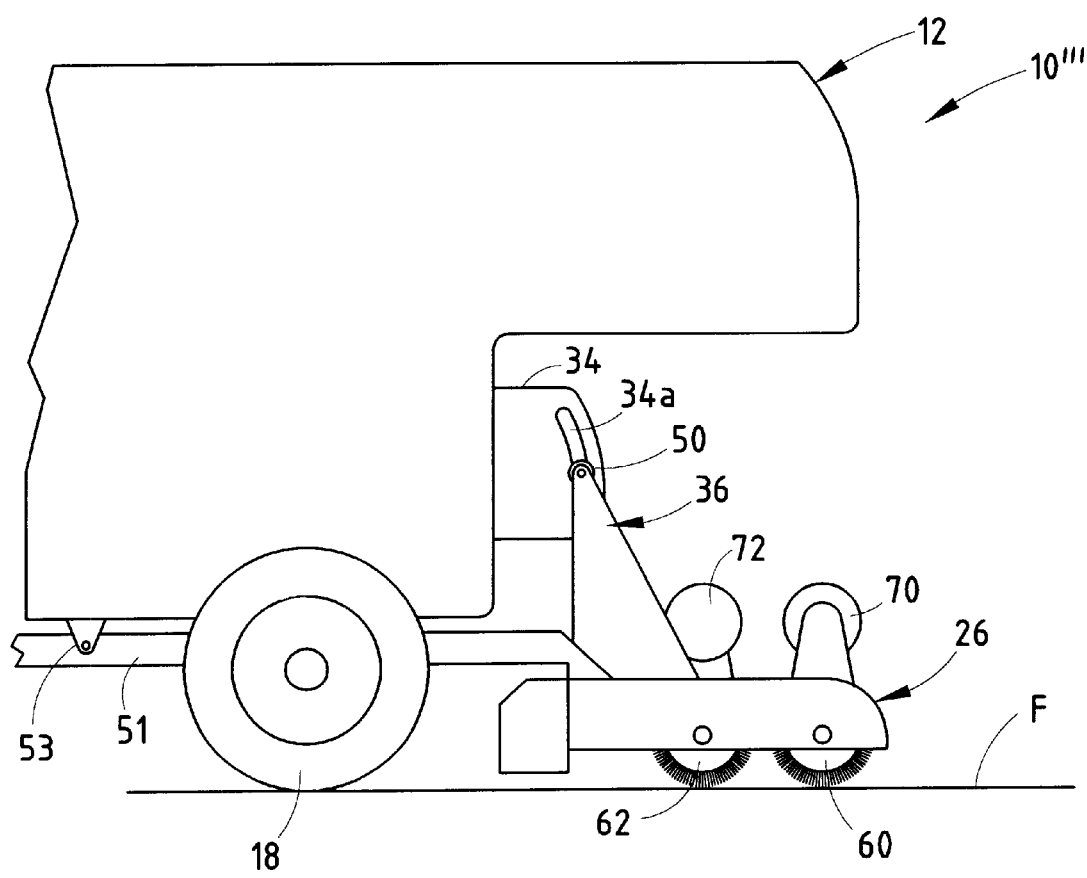
FIG. 11 is a fragmentary, side elevational, somewhat diagrammatic view of a second alternative suspension system of the scrub brush carriage.

In FIG. 11 is depicted a scrubbing machine embodiment 10'" employing a pair of horizontal cylindrical brushes 60 and 62 as in FIGS. 1–8 or FIG. 9 or FIG. 11, but using a less desirable suspension apparatus wherein the brush carriage 26 is mounted on the forward ends of a pair of laterally spaced horizontal parallel arms, 51 pivotally attached to the machine at a location 53 rearward of wheels 18. Elevation of the brush carriage on these arms will cause the vertical movement to be on a large radius arc, i.e., generally but not exactly parallel to the floor. The rearward location of the pivotal attachment is to minimize the brush arc angle when elevated above the floor surface. This suspension does not keep the elevating brushes completely parallel to the floor so that if the machine uses two brushes, one brush will tend to scrub on the floor with more intensity. The same cam track 34a and friction plate 34 and friction disc subassembly elements 46, 48, 50 and 52 are employed as in previous embodiments for controlling vibration.

As noted previously, the novel vibration control subassembly can be employed on floor conditioning machines for hard floor surface scrubbing, carpet cleaning/scrubbing, surface sweeping, floor polishing, and floor sanding.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A surface conditioning machine comprising:

a support structure and lower supporting wheels mounted on said support structure and defining a horizontal plane of support;

at least one powered surface engageable conditioning element beneath said support structure;

a carriage connecting said at least one conditioning element to said support structure whereby said at least one conditioning element is vertically movable beneath said support structure;

a power actuator between said support structure and said vertically movable carriage for raising or lowering said at least one conditioning element; and a frictional motion dampener between said carriage and said support structure to dampen vibration of said carriage during operation of said at least one conditioning element.

2. The surface conditioning machine in claim 1 wherein said frictional motion dampener comprises at least one friction member and at least one biasing member biasing said friction member toward a frictional relationship with said support structure.

3. The surface conditioning machine in claim 2 wherein said support structure includes a fixed member engaged by said at least one friction member.

4. The surface conditioning machine in claim 3 wherein said at least one friction member comprises a pair of friction members spaced from each other and astraddle said fixed member.

5. The surface conditioning machine in claim 4 wherein said at least one biasing member comprises a pair of biasing members biasing said pair of friction members against said fixed member.

6. The surface conditioning machine in claim 5 wherein said fixed member includes a cam track and said friction members have a cam follower therebetween and located to follow said cam track.

7. The surface conditioning machine in claim 1 wherein said carriage is mounted to said support structure with connector means for causing said carriage to be vertically movable generally parallel to said horizontal plane of support.

8. The surface conditioning machine in claim 7 wherein said frictional motion dampener includes a fixed member engaged by at least one friction member.

9. The surface conditioning machine in claim 8 wherein said at least one friction member comprises a pair of friction members spaced from each other and astraddle said fixed member, wherein a pair of biasing members bias said pair of friction members against said fixed member, said fixed member includes a cam track, and said friction members have a cam follower therebetween and located to follow said cam track.

10. A floor scrubbing machine comprising:
  a support structure and lower supporting wheels mounted on said support structure and defining a horizontal plane of support;
  powered scrub brushes beneath said support structure;
  a brush carriage connecting said scrub brushes to said support structure whereby said scrub brushes are vertically movable beneath said support structure;
  a power actuator between said support structure and said vertically movable carriage for raising or lowering said conditioning elements; and
  a frictional motion dampener between said carriage and said support structure to dampen vibration of said carriage during operation of said scrub brushes.

11. The floor scrubbing machine in claim 10 wherein said frictional motion dampener comprises at least one friction member and at least one biasing member biasing said friction member toward a frictional relationship with said support structure.

12. The floor scrubbing machine in claim 11 wherein said support structure includes at least one fixed member engaged by said at least one friction member.

13. The floor scrubbing machine in claim 12 wherein said at least one friction member comprises a pair of opposite friction members spaced from each other and astraddle said fixed member.

14. The floor scrubbing machine in claim 13 wherein said at least one biasing member comprises a pair of opposite biasing members biasing said pair of opposite friction members against said fixed member.

15. The floor scrubbing machine in claim 14 wherein said fixed member includes a cam track and said friction members have a cam follower therebetween and located to follow said cam track.

16. The floor scrubbing machine in claim 15 wherein said powered scrub brushes comprise horizontally oriented cylindrical brushes.

17. The floor scrubbing machine in claim 15 wherein said powered scrub brushes comprise disc brushes rotational on vertical axes.

18. The floor scrubbing machine in claim 10 wherein said brush carriage is mounted to said support structure with connector means for causing said carriage to be vertically movable generally parallel to said horizontal plane of support.

19. The floor scrubbing machine in claim 18 wherein said frictional motion dampener includes a fixed member engaged by said at least one friction member.

20. The floor scrubbing machine in claim 19 wherein said at least one friction member comprises a pair of friction members spaced from each other and astraddle said fixed member, wherein a pair of biasing members bias said pair of friction members against said fixed member, said fixed member includes a cam track, and said friction members have a cam follower therebetween and located to follow said cam track.

21. The floor scrubbing machine in claim 20 wherein said powered scrub brushes comprise horizontally oriented cylindrical brushes.

22. The floor scrubbing machine in claim 20 wherein said powered scrub brushes comprise disc brushes rotational on vertical axes.

23. A floor scrubbing machine comprising:
  a support structure and lower supporting wheels mounted on said support structure and defining a horizontal plane of support;
  powered scrub brushes beneath said support structure;
  a brush carriage connecting said scrub brushes to said support structure;
  a frictional motion dampener between said brush carriage and said support structure to dampen vibration of said carriage, comprising at least one fixed member, a pair of friction members on said brush carriage spaced from each other and astraddle said at least one fixed member, and a pair of biasing members biasing said pair of friction members against said fixed member.

24. The floor scrubbing machine in claim 23 wherein said fixed member includes a cam track and said friction members have a cam follower therebetween and located to follow said cam track.

25. The floor scrubbing machine in claim 23 wherein said frictional motion dampener includes a cross pin extending through said friction members and said fixed member, and said pair of biasing members are coil springs on said cross pin.

26. The floor scrubbing machine in claim 25 wherein said coil springs are compression coil springs.

27. The floor scrubbing machine in claim 26 wherein said brush carriage includes a pair of arms straddling said coil springs, said friction members and said fixed member.

\* \* \* \* \*